May 24, 1927.
A. L. CARTER
1,629,992
LIQUID GAUGE
Filed March 6, 1922
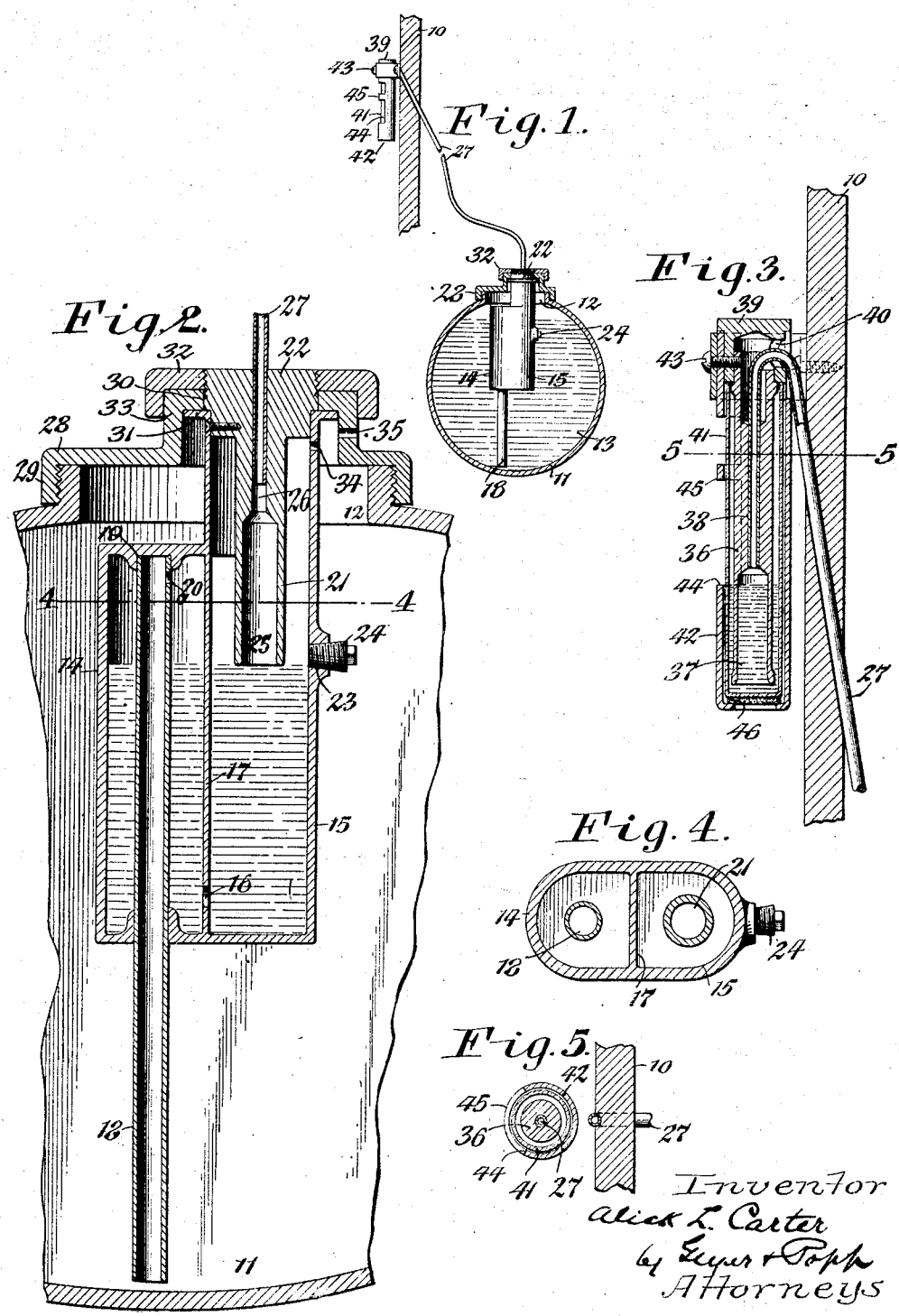
Inventor
Alick L. Carter
by Geyer & Popp
Attorneys Patented May 24, 1927.

1,629,992

UNITED STATES PATENT OFFICE.

ALICK L. CARTER, OF KENMORE, NEW YORK, ASSIGNOR, BY MESNE ASSIGNMENTS, TO THE GROLAN MANUFACTURING COMPANY, OF DAYTON, OHIO, A CORPORATION OF DELAWARE.

LIQUID GAUGE.

Application filed March 6, 1922. Serial No. 541,268.

This invention relates to a liquid level gauge which is more particularly designed for indicating the level of the liquid in a gasoline supply tank although the same may obviously be employed to advantage for gauging other liquids in equivalent installations.

It is the object of the present invention to provide a gauge, wherein the air that is trapped in the primary transmitting tube and its tube connected with the indicating device, would vary so little in volume with the temperature, as would not create any wide range of fluctuation of the fluid level in the indicator; that is, such as would render the gauge unreliable from a practical viewpoint. In other words, the variation of the air so trapped is so small, that it would not prevent the indicator from indicating the amount of gasoline in the tank, that is within the range of the variations of the air in the transmitting tube and its tube connecting with the indicator.

Another object of this invention is to secure this result by means which are of simple construction, not liable to get out of order and capable of being readily installed.

In the accompanying drawings:

Figure 1 is a side elevation showing my invention used in connection with a depressed gasoline supply tank and an elevated instrument board of an automobile. Figure 2 is a vertical section of the actuating member of the gauge. Figure 3 is a similar view of the indicating member of the same. Figures 4 and 5 are horizontal sections taken on the correspondingly numbered lines in Figs. 2 and 3, respectively.

Similar characters of reference refer to like parts throughout the several views.

In the drawing my improved liquid gauge is employed to indicate to the driver of an automobile while seated in rear of the usual instrument board 10, the level of the liquid in the tank 11 which contains the supply of gasoline whereby the engine is operated, the board as usual being elevated and the tank depressed relatively to each other.

Generally speaking this liquid gauge comprises an actuating member which is arranged in the gasoline tank and responds to variations in the level of the liquid in the tank, and an indicating member which is operatively connected with the actuating member and responds to the action of the actuating member.

The actuating member is preferably arranged within the filling opening 12 in the top of the gasoline tank through which the latter is usually replenished with liquid 13. In its preferred form this actuating member is constructed as follows:

Within the upper part of the tank adjacent to the filling opening thereof are arranged a primary liquid chamber 14 and a secondary liquid chamber 15 which are preferably secured to each other side by side in any suitable manner. The lower end of these chambers are constantly in communication with each other, this being preferably accomplished by an opening 16 in the wall 17 between these chambers. Extending upwardly through the bottom of the primary chamber is a primary air transmitting pipe or tube 18 which preferably engages its upper end with a seat 19 on the top of the primary chamber while its open lower end is arranged near the bottom of the gasoline tank and communicates with the interior of the tank. At its upper end the primary tube or pipe is provided with a lateral opening 20 whereby the interior of this pipe and the primary chamber are constantly in communication. The lower ends of the primary and secondary liquid chambers are preferably flush, but the upper end of the primary chamber is arranged below the top of the tank and the upper end of the secondary chamber projects upwardly above the primary chamber and is arranged within the filling opening of the tank. Centrally within the upper part of the secondary liquid chamber is arranged a vertical secondary air transmitting pipe or tube 21 which has an enlarged head 22 at its upper end secured to the upper end of the secondary chamber and forming a closure therefore while its lower end opens into this chamber about midway of its height. At its side the secondary chamber is provided with a test opening 23 preferably on a line with the lower end of the pipe 21 and normally closed by a screw plug 24, the purpose of which opening and plug will presently appear.

The lower part 25 of the bore of the secondary air transmitting tube or pipe 21 is enlarged while the upper part 26 thereof is reduced and connected with a final transmission tube or pipe 27. The pipes 21 and 27 constitute an air transmitting tubular connection leading from the secondary chamber 15 to the indicating member as hereinafter explained.

The actuating member may be supported on the tank in any suitable manner for instance, as shown in Fig. 2, by a cap 28 secured by a screw joint to a flange 29 around the filling opening and provided with an opening 30 which receives the upper part of the head 22, an external flange 31 arranged on the upper part of the secondary chamber and engaging with the underside of the cap 28, and a screw clamping ring 32 engaging with a neck 33 around the opening 30 and engaging with the upper end of the secondary chamber. Communication is established between the upper part of the secondary liquid chamber and the interior of the tank as well as the external atmosphere by a vent opening 34 in the side of the upper part of the wall of the secondary liquid chamber and a vent opening 35 in the cap 28.

In preparing this actuating member for use any suitable transmitting liquid, such as oil, is poured into the secondary liquid chamber at the upper end thereof while the head 22 and the secondary transmitting tube are removed therefrom which fluid also enters the primary chamber through the opening 16. The introduction of liquid into these chambers is preferably effected while the plug 24 is removed so that when the liquid appears at the test opening it serves to notify the attendant that the liquid in both chambers is in line with the lower end of the secondary transmitting tube where it should be, after which the test opening is closed by the plug 24 and the actuating member put within the tank and secured in place by the clamping ring 32.

When the tank 11 is supplied with gasoline it will enter the lower end of the tube 12, forcing the air therein upwardly and out through the opening 20 into the primary liquid chamber. This increased pressure on the liquid in such chamber will cause it to flow through the opening 16 into the secondary liquid chamber, thereby causing the liquid to rise in said secondary chamber, some of it entering the bore 25 of the secondary transmitting tube and forcing the air therein upwardly and out through the final transmission tube.

When the liquid level in the tank drops the column of liquid in the lower part of the primary transmitting tube descends in the same measure which relieves the air pressure on the liquid in the primary chamber and permits the same to rise therein under the preponderating weight of the higher liquid level in the secondary chamber which latter descends in the same measure that the liquid level in the primary chamber rises due to a lowering of the liquid level in the tank. During this descent of the liquid level in the secondary chamber the air in the secondary transmitting tube and the final transmission tube is drawn backwardly a corresponding extent. This outward and inward movement of the air in the final transmission and secondary transmitting tubes is utilized to operate the indicating member which is mounted on the instrument board so that the latter is responsive to variations in the height of the liquid in the tank and keeps the driver posted as to when the same needs replenishing.

The indicating member forming part of my improved liquid gauge is constructed as follows:

36 represents a tubular upright indicator body which has the lower part 37 of its bore enlarged and opening downwardly while the upper part 38 of the same is reduced and connected with the upper end of the final air transmission tube 27. To the upper end of this body is secured a cap 39 which has an opening 40 in its side for the passage of the transmission tube. Surrounding the tubular body is a sight or gauge tube 41 of glass or similar transparent material which is spaced from the side and lower end of the body 36 and is closed at its lower end while its upper end is not closed but held loosely against the lower end of the cap 39. This sight glass is protected against injury by a casing or guard 42 enclosing the same and secured at its upper end to the cap 38 by a screw 43 or other suitable means. On its front side this casing is provided with a sight opening 44 through which the level of the liquid in the sight tube is visible. Extending across this opening about midway of the height of the same and supported on the adjacent part of the casing is an indicating bar 45 which serves to indicate to the driver if the gasoline tank is full or when the gasoline in the supply tank is located at a certain level. A cushion 46 is preferably arranged between the underside of the sight tube or gauge glass and the bottom of the casing for holding this tube yieldingly in place.

When the gasoline in the supply tank rises the air is pushed upwardly through the transmission tube 27 by the action of the air transmitting devices which respond to the gasoline level thereby causing the liquid in the tubular body of the indicator to descend and the liquid between this body and the sight tube to rise. On the other hand if the level of the gasoline in the tank is lowered and the air pressure on top of the column of liquid in the indicator body is accordingly reduced, the liquid in the sight tube will descend and rise correspondingly in the indicator body. The attendant by this means can tell at a glance the amount of gasoline in the tank and govern himself accordingly.

In the use of this apparatus it is desirable to permit the liquid of the actuating member to first come to the temperature of liquid in the tank or the temperature within the tank before attempting to obtain an accurate reading of this instrument.

The variation of air that is trapped in the transmitting tube 21 and in the tube 27, that is in volume with the temperature, is so small that it would not prevent the indicator from indicating the amount of gasoline in the tank.

As a whole this instrument is very simple in construction, the same can be produced at low cost and can be readily installed and the same is not liable to get out of order by ordinary use.

I claim as my invention:

1. A liquid level gauge comprising a primary liquid chamber to receive liquid, said chamber being closed at its upper end to form an air cushion above the level of liquid, a secondary liquid chamber having its lower end flush with the lower end of the primary chamber and its upper end extending above the upper end of the primary chamber and communicating with the atmosphere and having its lower part communicating with and receiving liquid from the lower part of said primary chamber, a primary transmitting tube passing through the bottom of said primary chamber and adapted to project with its lower end into the body of liquid to be gauged and having its upper end engaging the top of the primary chamber and provided with an opening whereby the upper ends of the primary tube and chamber are in constant communication, a secondary air transmitting tubular connection having an open lower end projecting downwardly into the upper part of said secondary liquid chamber and having a downwardly projecting open upper end, and a transparent tubular body surrounding the open upper end of said secondary transmitting tubular connection and having a closed lower end and adapted to contain an indicating liquid and communicating at its upper end with the atmosphere.

2. A liquid level gauge comprising a primary liquid chamber to receive liquid, said chamber being closed at its upper end to form an air cushion above the level of liquid, a secondary liquid chamber having its lower end flush with the lower end of the primary chamber and its upper end extending above the upper end of the primary chamber and communicating with the atmosphere and having its lower part communicating with and receiving liquid from the lower part of said primary chamber, a primary transmitting tube passing through the bottom of said primary chamber and adapted to project with its lower end into the body of liquid to be gauged and having its upper end engaging the top of the primary chamber and provided with an opening whereby the upper ends of the primary tube and chamber are in constant communication, a secondary air transmitting tubular connection having an open lower end projecting downwardly into the upper part of said secondary liquid chamber and having an enlarged upper end forming a closure for the secondary chamber, an upwardly and downwardly projecting transmission tube leading from the open upper end of said secondary tube, a transparent tubular body surrounding the open upper end of said transmitting tubular connection and adapted to contain an indicating liquid and having a closed lower end and communicating at its upper end with the atmosphere, a cap surrounding said enlarged upper end of the secondary tube and engaging with the upper end of said secondary chamber and adapted to be secured over the filling opening of the tank containing the liquid to be gauged, and a clamping ring having a screw connection with the upper end of said head and engaging with the top of said cap.

3. A liquid level gauge comprising primary and secondary liquid chambers side by side and adapted to contain liquid, the upper end of the primary liquid chamber being closed to form an air cushion above the level of liquid, the lower end of the secondary liquid chamber communicating with and receiving liquid from the lower part of the primary chamber, with the upper end of the secondary chamber in communication with the atmosphere, a primary transmitting tube passing down through the bottom of the primary chamber with its lower end at the bottom of the liquid to be gauged and its upper end connected to and supported by the closed end of the primary chamber and provided with an opening, thereby connecting the primary chamber and the interior of the tube, and a secondary air transmitting tubular connection having an open lower end projecting downwardly into the upper part of said secondary liquid chamber, and a liquid level-indicating means operatively connected to the other end of the secondary air transmitting tubular connection.

ALICK L. CARTER.